United States Patent [19]

Aldinger et al.

[11] 4,368,320

[45] Jan. 11, 1983

[54] PROCESS FOR THE PRODUCTION OF A HYDROXYL GROUP CONTAINING ε-CAPROLACTONE MODIFIED (METH) ACRYLATE RESIN

[75] Inventors: Werner Aldinger, Freigericht-Horbach; Helmut Anzt, Hanau; Gerhard Morlock, Hanau; Hans-Peter Schaufler, Hanau, all of Fed. Rep. of Germany

[73] Assignee: Degussa Aktiengesellschaft, Frankfurt, Fed. Rep. of Germany

[21] Appl. No.: 284,255

[22] Filed: Jul. 17, 1981

[30] Foreign Application Priority Data

Jul. 23, 1980 [DE] Fed. Rep. of Germany ....... 3027776

[51] Int. Cl.$^3$ ..................... C08G 63/08; C08F 218/02
[52] U.S. Cl. .................... 528/355; 526/320; 528/354; 528/357; 528/81; 525/374
[58] Field of Search .................. 528/354, 355, 357; 526/320

[56] References Cited

U.S. PATENT DOCUMENTS 4,005,155  1/1977  Sampson et al. ................. 260/851
4,082,816  4/1978  Fisk et al. ........................ 260/855
4,245,076  1/1981  Marquardt ....................... 526/320

FOREIGN PATENT DOCUMENTS 1257638 12/1971 United Kingdom .

*Primary Examiner*—Earl A. Nielsen
*Attorney, Agent, or Firm*—Cushman, Darby & Cushman

[57] ABSTRACT

Acrylate and methacrylate resins containing hydroxyl groups and modified by ε-caprolactone are produced by producing an adduct of a hydroxyalkylacrylate or methacrylate and ε-caprolactone in a first step and then in a second step radically copolymerizing this product with further acrylic acid or methacrylic acid esters and optionally vinyl aromatics in a suitable varnish solvent. The thus obtained copolymerizate solutions after addition of a polyvalent isocyanate are used to produce coatings on substrates and give a baked on lacquer coating with outstanding adhesion to the base.

22 Claims, No Drawings

PROCESS FOR THE PRODUCTION OF A HYDROXYL GROUP CONTAINING ε-CAPROLACTONE MODIFIED (METH) ACRYLATE RESIN

BACKGROUND OF THE INVENTION

The object of the present invention is the development of a process for the production of hydroxyl group containing ε-caprolactone modified acrylate or methacrylate resins cross-linkable with polyvalent isocyanates and the resinous products obtainable thereby.

There is already known from Fisk U.S. Pat. No. 4,082,816 a process for the production of ε-caprolactone modified acrylate and methacrylate resins. In this known process there is polymerized a mixture of 60 to 98 weight percent of at least one monomer of the group styrene, α-alkyl styrene and lower alkyl esters of acrylic and methacrylic acid and 40 to 2 weight percent of at least one hydroxyalkyl ester of acrylic or methacrylic acid together with ε-caprolactone in such an amount that 0.25 to 15 moles of ε-caprolactone correspond to one OH-equivalent of the monomer mixture, in the presence of a radical catalyst and a polymerization catalyst for the ε-caprolactone, advantageously in solution in a customary solvent. The entire disclosure of Fisk U.S. Pat. No. 4,082,816 is hereby incorporated by reference and relied upon.

If acrylate or methacrylate resins produced according to the known process are mixed with etherified melamine-formaldehyde resins and cross-linked on a deep drawable metal sheet by baking then the adhesion of the varnish coating to the base expressed as the grid cut value according to DIN 53151 (German Industrial Standard 53151) is very unsatisfactory. The adhesion of the varnish coating to the base is indeed somewhat better if in place of an etherified melamine-formaldehyde resin, there is used a known cross-linking agent for hydroxyl group containing methacrylate or acrylate resins based on polyvalent isocyanates, however, in many cases this is still insufficient.

SUMMARY OF THE INVENTION

The process of the invention is characterized by
(1) reacting at least one monoester of acrylic acid or methacrylic acid with an alkanediol having 2 to 4 carbon atoms in the molar ratio of 1.5:1 to 1:3 with ε-caprolactone at a temperature between 60° and 130° C. in the presence of 0.005 to 0.15 weight percent based on the weight of the ε-caprolactone employed of an organotin compound known to be a catalyst for the reaction of a hydroxyl group containing compound with ε-caprolactone and
(2) copolymerizing
  (a) 15 to 55 weight percent of the adduct obtained according to (1) with
  (b) 45 to 85 weight percent of a mixture of monomers which in turn is composed of, in each case based on the weight of component (b)
  ($b_1$) 10 to 90 weight percent of at least one ester of methacrylic acid whose homopolymerizate has a glass transition temperature of above 60° C.,
  ($b_2$) 10 to 90 weight percent of at least one ester of acrylic or methacrylic acid whose homopolymerizate has a glass transition temperature of below 60° C.
  ($b_3$) 0 to 35 weight percent of at least one vinyl aromatic compound and
  ($b_4$) 0 to 10 weight percent of at least one monoester of acrylic or methacrylic acid with an alkanediol having 2 to 4 carbon atoms as a solution in
(c) 15 to 45 weight percent based on the total weight of components (a), (b) and (c) of at least one customary solvent for varnishes based on an acrylate or methacrylate resin and inert to isocyanates in the presence of at least one catalyst known to decompose thermally into radicals (i.e. a free radical generating catalyst).

While in the process known from U.S. Pat. No. 4,082,816 the radical polymerization of the mixture of monomers and the reaction with the ε-caprolactone are carried out simultaneously according to a type of "one pot reaction" in the process of the invention, first there must be separately produced an adduct of a hydroxyalkylacrylate or methacrylate and ε-caprolactone which then in a second step as "monomer" is free radically polymerized together with the other monomers. Surprisingly there is obtained thereby an acrylate or methacrylate resin which after addition of a polyvalent isocyanate results in a varnish layer having outstanding adhesion to the base after coating on a substrate.

In the first step of the process of the invention there is reacted at least one monoester of acrylic or methacrylic acid with an, alkanediol having 2 to 4 carbon atoms in the molar ratio of 1.5:1 to 1:3 with ε-caprolactone. Suitable esters for example are 2-hydroxyethyl acrylate, 2-hydroxyethyl methacrylate, 2-hydroxypropylacrylate, 2-hydroxypropyl methacrylate, 4-hydroxybutyl acrylate, 4-hydroxybutyl methacrylate, 3-hydroxypropyl acrylate and 3-hydroxypropyl methacrylate. The reaction takes place at a temperature between 60° and 130° C. and in the presence of 0.005 to 0.15 weight percent, based on the weight of the ε-caprolactone employed of a known organotin compound. Suitable organotin compounds for example are dibutyltin oxide, dioctyltin oxide, dibutyltin dilauryl mercaptide, dibutyltin glycolate, dibutyltin diacetate, dioctyltindiacetate, dilauryltin diacetate, dibutyltin dilaurate, dibutyltin maleate, dimethyltin oxide, dimethyltin dilaurate, dimethyltin diacetate or dimethyltin glycolate. The reaction suitably takes place in absence of an additional solvent in such a way that the hydroxy ester is present together with the organotin compound and the ε-caprolactone is slowly dosed in. It is advantageous if after the ending of the dosing the reaction mixture is still held at the reaction temperature for 2 to 3 hours. Furthermore, it is advisable to lead air through the reaction mixture to avoid a thermally initiated polymerization.

The thus obtained adduct requires no further working up but instead can be directly further processed to an acrylate or methacrylate resin. Since it is storage stable for long periods of time, however, it can also be intermediately stored before the further processing. Through this it is possible to produce this adduct as other monomers in advance supply.

In the second step of the process of the invention there are then copolymerized 15 to 55 weight percent, preferably 30 to 55 weight percent of the adduct of the hydroxyester and the ε-caprolactone with 45 to 85 weight percent, preferably 45 to 70 weight percent of a mixture of additional combined monomers and as solution in 15 to 45 weight percent, based on the total weight of the adduct, the monomer mixture and the solvent of at least one solvent customarily employed for varnishes based on acrylate or methacrylate resins and inert to isocyanates at an elevated temperature, preferably between 80° and 150° C. in the presence of at least one known catalyst which thermally decomposes into radicals, i.e., a free radical generating catalyst.

If the adduct of the hydroxy ester and the ε-caprolactone is employed in an amount near the lower limit of the above mentioned range, for example, from 15 to 30 weight percent, then there is obtained an acrylate or methacrylate resin having a relatively low content of hydroxy groups. Through this the amount of polyvalent isocyanate needed for the cross-linking can be correspondingly held low, which makes possible the formulation of particularly low cost baking varnishes. Surprisingly the baked on varnish films are already resistant to gasoline beginning with a hydroxyl group content of the acrylate or methacrylate resin of 0.95 weight percent.

On the other hand, if the adduct of the hydroxy ester and the ε-caprolactone is employed in an amount near the upper limit of the above-mentioned range, for example from 40 to 55 weight percent, then there is the advantage that even in using cycloaliphatic polyisocyanates based on isophorone diisocyanate as cross-linker there are obtained varnishes which still result in very flexible varnish films.

The mixture of additional monomers used in turn is composed of 10 to 90 weight percent, preferably 30 to 70 weight percent of at least one ester of methacrylic acid whose homopolymerizate has a glass transition temperature of above 60° C., 10 to 90 weight percent, preferably 30 to 70 weight percent, of at least one ester of acrylic or methacrylic acid whose homopolymerizate has a glass transition temperature below 60° C., preferably below 0° C., 0 to 35 weight percent of at least one vinyl aromatic, e.g. a vinyl aromatic hydrocarbon, and 0 to 10 weight percent of at least one monoester of acrylic or methacrylic acid with an alkanediol having 2 to 4 carbon atoms, whereby the named components of the mixture always must add up to 100 weight percent.

Suitable esters of methacrylic acid whose homopolymerizates have a glass transition temperature of above 60° C. are for example tert.-butyl methacrylate, cyclohexyl methacrylate or neopentyl methacrylate, as well as the preferably used methyl methacrylate. If this ester of methacrylic acid is employed in an amount near the upper limit of the above-mentioned range, for example, from 60 to 90 weight percent, then there can be formulated varnishes which as lacquer films exhibit a particularly high surface hardness.

To the esters of acrylic or methacrylic acid whose homopolymerizates have a glass transition temperature below 60° C. there belong many alkyl esters having 2 to 10, preferably 4 to 10 carbon atoms in the alcohol component. For example there can be used ethyl acrylate, n-butyl acrylate, n-hexyl acrylate, 2-ethylhexyl acrylate, n-octylacrylate and n-decyl acrylate as well as the corresponding esters of methacrylic acid, e.g. ethyl methacrylate, n-butyl methacrylate, n-hexylmethacrylate, 2-ethylhexyl methacrylate, n-octylmethacrylate, and n-decyl methacrylate. Preferably there are used n-butyl acrylate and 2-ethylhexyl acrylate.

Suitable vinyl aromatics besides the preferred styrene are for example α-methyl styrene and the vinyl toluenes, i.e. p-vinyl toluene, m-vinyl toluene and o-vinyl toluene.

As monoesters of acrylic or methacrylic acid with an alkanediol having 2 to 4 carbon atoms there can be used the same ones employed in the production of the adduct with ε-caprolactone, thus for example 2-hydroxyethyl acrylate, 2-hydroxyethyl methacrylate, 2-hydroxypropylacrylate, 2-hydroxypropyl methacrylate, 4-hydroxybutyl acrylate or 4-hydroxybutyl methacrylate. Preferably there is employed 2-hydroxyethyl acrylate.

The solvents used for carrying out the radical polymerization later then are also the solvent for the final varnish and consequently must be inert to isocyanates. Suitable solvents for example are, e.g. esters such as glycol esters of alkanoic acids, e.g. ethyl glycol acetate or n-butyl glycol acetate, alkyl alkanoates, e.g. ethyl acetate or n-butyl acetate; ketones such as methyl ethyl ketone, methylisobutyl ketone or acetone, or aromatic hydrocarbons such as toluene, the xylenes, e.g. p-xylene, o-xylene, m-xylene or mixtures thereof, benzene, or commercial mixtures of aromatic hydrocarbons having a boiling range between about 150° and about 186° C. In many cases it is advantageous to use a mixture of several solvents, for example of aromatic hydrocarbons, e.g. toluene, and ethyl glycol acetate or n-butyl acetate.

If the radical polymerization is carried out in relatively concentrated solution, thus the solvent is employed in an amount of only about 15 to about 30 percent, then it is suitable to use as initiators one of the known catalysts thermally decomposing into radicals and having a half life between 0.3 and 0.7 hours at 130° C., for example tert.butylperbenzoate, tert.butyl peracetate or 2,5-dimethylhexyl-2,5-diperbenzoate or the other catalysts with such half lives such as shown in Encyclopedia of Polymer Science and Technology, Volume 9, pages 814–841, especially 818–827 and Kirk-Othmer, Encyclopedia of Chemical Technology, 2nd edition, Volume 14, pages 811–813 for example. Both of these citations are hereby incorporated by reference and relied upon. Preferably the initiator is used in an amount of 3.0 to 5.0 weight percent based on the total weight of the polymerizable materials, accordingly the ε-caprolactone adduct and the rest of the monomers employed.

On the other hand, if the solvent is employed in larger amounts, thus from about 30 to 45 weight percent, it is more advantageous to use as initiator one of the catalysts thermally decomposing into radicals and having a half life between 0.005 to 0.7 hours at 100° C. Such catalysts for example are azoisobutyronitrile, diisopropyl peroxydicarbonate, lauroyl peroxide, succinyl peroxide, benzoyl peroxide, p-chlorobenzoyl peroxide, or tert.-butylperoxy-2-ethyl-hexanoate or the other catalysts with such half lifes, e.g. as shown in Kirk-Othmer, Encyclopedia of Chemical Technology, 2nd edition, Volume 14, pages 811–813 and the Encyclopedia of Polymer Science and Technology, Volume 9, pages 814–841. Preferably the initiator is used in an amount of 1.5 to 3.0 weight percent based on the total weight of the polymerizable materials.

The radical polymerization for example can be carried out in such manner that the solvent is present and is heated to the polymerization temperature while leading nitrogen therethrough. Then within 2 to 6 hours there is slowly dosed in the mixture of polymerizable materials which contain the catalyst or the main amount of catalyst. To avoid an undesired high content of residual monomer it can be advantageous to add a small portion of the catalyst all at once to the polymerization mixture only after the end of the dosing in of the polymerizable materials and to heat at the polymerization temperature this mixture for a certain further time, for example 1 to 2 hours.

If only about 15 to 30 weight percent of solvent is employed then in certain cases the last mentioned procedure, accordingly the subsequent addition of a portion of the catalyst all at once, can have the result that the concentrated copolymerizate solution formed has an undesirably high viscosity. In these cases therefore it is advantageous in order to avoid an undesirably high content of residual monomers to add the entire amount of catalyst to the mixture of polymerizable materials, but to use a mixture of a catalyst with a lower half life and a catalyst with a higher half life. Such mixtures for example can consist of (a) a diacylperoxide or a perester and (b) an alkyl hydroperoxide or a dialkyl peroxide. Especially suitable are such mixtures in which one of the components has a half life of 0.02 to 0.7 hours and the other component a half life of 1 to 6 hours at 130° C. Preferred are the mixtures tert.butylperoxy-2-ethylhexanoate/di-tert.butylperoxide; dibenzoyl peroxide/dicumyl peroxide; tert.butylperbenzoate/di.-tert.butyl peroxide. Preferably there is employed the component having the lower half life in an amount of 2.0 to 3.0 weight percent and the component with the higher half life in an amount of 1.0 to 2.5 weight percent, in each case based on the total weight of the polymerizable materials.

It is known that polymerizates with the same average molecular weight (number average) but different molecular inhomogeneity, have different solution viscosities. The polymerizate with the greater inhomogeneity always exhibits a higher solution viscosity since the high molecular weight portion furnishes a substantially higher share to the viscosity than the same amount of lower molecular weight portion. Besides a wide molecular weight distribution means that the number of reactive groups per molecule and therewith the reactivity of the individual chains is very different. Above all toward the end of the polymerization there can be formed chemically very inhomogeneous polymer chains which can lead to incompatibility phenomena or disturbances in the varnish films produced later.

Therefore it is advisable to use molecular weight regulators which narrow the breadth of the distribution of molecular weight. The effectiveness of the molecular weight regulator of course is limited to a specific temperature range. At polymerization temperatures above 130° C. even in using high concentrations of molecular weight regulators there can only be produced very inhomogeneous polymerizates. Customarily high polymerization temperatures only have as a consequence a shifting of the average molecular weight of the polymerizate. Only a high initiator concentration which is continuously and simultaneously present with a corresponding amount of monomer in the reaction vessel permits a polymerization under stationary conditions which lead to molecularly homogeneous polymerizates.

As molecular weight regulators for lower reaction temperatures there can be used thiol group containing compounds such as mercapto mono-and dicarboxylic acids in the form of mercaptoacetic acid, 2-mercaptopropionic acid, 2-mercaptobenzoic acid and mercaptoisophthalic acid, the methyl ester of thioglycolic acid, the ethyl ester of thioglycolic acid, isooctyl ester of thioglycolic acid, lauryl ester of thioglycolic acid, mercaptoethanol or n-dodecyl mercaptane.

Of the thiol compounds mentioned, mercaptoethanol is especially suitable since the oxyethylenesulfide groups formed from it contribute to the total number of hydroxyl groups in the polymerizate and n-dodecyl mercaptan is especially suitable because of its only weak odor and its low toxicity.

The more or less concentrated copolymerizate solutions present after the radical polymerization can now be further processed according to customary procedures to form baking varnishes. Thus there can be added to them customary adjuvants and additives such as processing agents, for example silicone oils (e.g. dimethylsilicone oils), matting agents, antiprecipitating agents or defoaming agents, as well as in a given case pigments such as titanium dioxide of the rutile type, zinc sulfate, lithopone, zinc sulfide, zinc oxide, antimony oxide, suitable carbon blacks or organic pigments.

Finally there is added as cross-linker a polyvalent isocyanate. For light resistant two component varnishes having high weather resistance there are only suited aliphatic or cycloaliphatic polyisocyanates. Besides the monomers there can also be used the dimer and trimer forms, such as uretdiones, biurets or isocyanurates.

Suitable aliphatic polyisocyanates are ethylenediisocyanate, propylenediisocyanate, tetramethylenediisocyanate, hexamethylenediisocyanate, trimethylhexamethylenediisocyanate and lysine diisocyanate methyl ester. Preferred is the polyisocyanate containing biuret groups obtainable from hexamethylene-diisocyanate by reaction with water, since it is no longer volatile.

Suitable cycloaliphatic polyisocyanates are 1,4-dimethylcyclohexanediisocyanate, 1-methylcyclohexan-2,4-diisocyanate, 4,4'-methylene-bis-(cyclohexyldiisocyanate), 3-isocyanatomethyl-3,5,5-trimethylcyclohexylisocyanate. Preferred are isocyanurates based on the cycloaliphatic isophoronediisocyanate which have a functionality between 3 and 4.

Illustrative aromatic diisocyanates are toluene diisocyanate, 4,4-methylene-bis-(phenylisocyanate), and 4,4'-oxy-bis-(phenyl-isocyanate).

The speed of the cross-linking reaction between the acrylate and methacrylate resins produced according to the process of the invention and the polyvalent isocyanates is too low for many practical uses. To accelerate this, there can be added ester amines or tertiary amines, such as tributylamine, in concentrations of 0.02 to maximally 0.5 weight percent, calculated on the weight of the acrylate or methacrylate resin solids and the isocyanate. In using cycloaliphatic polyisocyanates for acceleration there are recommended combinations of dibutyltin dilaurate and calcium octoate (calcium-2-ethylhexoate). The suitable amounts of dibutyltin dilaurate added lie between 0.01 and 1.0 weight percent, those of the calcium octoate between 0.4 and 0.8 weight percent, in each case based on the weight of the acrylate or methacrylate resin solids and the isocyanate.

The polyvalent isocyanate is suitably added in such amounts that 0.9 to 1.2, preferably 1.0 to 1.1 isocyanate groups are present for each hydroxyl group of the acrylate or methacrylate resin. On metallic supports, e.g., steel or copper, optimal properties of the baked on varnish coating are obtained when the two components are employed in the stoichiometrical ratio.

The content of hydroxyl groups of the acrylate or methacrylate resins produced according to the process of the invention ranges between 0.51 and 6.3 weight percent. In cases in which it must be necessary that the baked on varnish coating be resistant against solvents, especially fuels, however, the composition of the starting mixture for the radical polymerization should be so selected that the content of the hydroxyl groups of the acrylate or methacrylate resin is at least 0.95 weight percent.

When all additives are incorporated in the copolymerizate solution, the mixture is so regulated through addition of further solvent that the time for running out of a DIN beaker having a 4 mm nozzle, measured at 23° C. is about 20 to 40 seconds.

The varnish can be applied to various types of substrates, especially metal sheets by spraying, casting, rolls, or doctoring in coating thicknesses of 30 to 70μ. After short, for example 10 minutes, dust free airing the varnish films are baked on at temperatures between 80° and 150° C. Baking temperatures between 80° and 130° C. are preferred when using aliphatic polyisocyanates and between 110° and 150° C. when using cycloaliphatic polyisocyanates. The duration of the baking should suitably amount to about 15 to 40 minutes.

The process of the invention, the use of the copolymerizate solutions obtained thereby for the production of varnishes and the properties of the baked on varnish films are set forth in more detail in the following examples. Unless otherwise indicated, all parts and percentages are by weight.

The process can comprise, consist essentially of, or consist of the steps set forth with the stated materials.

To evaluate the mechanical properties of the baked on varnish films, there were employed the generally customary tests.

DETAILED DESCRIPTION

EXAMPLE 1

(a) Production of an Adduct of 2-Hydroxyethyl Acrylate and ε-Caprolactone

There were present in a reaction vessel equipped with stirrer, thermometer, dropping funnel, reflux condenser, and controllable heating 50.41 parts of 2-hydroxyethyl acrylate (stabilized with 625 ppm of hydroquinone monomethyl ether) and 0.043 parts dibutyltin oxide. The mixture was heated to 120° C. under intensive leading through of air and there were dosed in via the dropping funnel within two hours:

49.54 parts of ε-caprolactone.

The mixture was heated at 120° C. with stirring for a further two hours. The adduct formed can be employed without further processing for the subsequent copolymerization.

(b) Production of a (Meth) Acrylate Resin

There were present in a reaction vessel equipped with stirrer, thermometer, dropping funnel, reflux condenser, and controllable heating:
66.67 parts of a solvent mixture consisting of 2 parts xylene, 1 part of a mixture of aromatic hydrocarbons having a boiling range between about 150° and 186° C. (Shellsol A) and 1 part n-butyl acetate. While leading nitrogen therethrough the mixture was heated to 115° C., and there was dosed in within 3 hours a mixture of
36.5 parts of the adduct obtained according to (a)
25.0 parts methyl methacrylate
35.0 parts 2-ethylhexyl acrylate
3.5 parts 2-hydroxyethyl acrylate and
2.5 parts tert.butylperoxy-2-ethylhexanoate. Subsequently, there were added a further 0.5 parts tert.butylperoxy-2-ethylhexanoate and the mixture stirred for a further 3 hours at 150° C. The 60% copolymerizate solution formed had a dynamic viscosity at 25° C. of 920 mpa's.

(c) Production of a White Pigmented Varnish 100 parts of the copolymerizate solution obtained according to (b) and
60 parts of rutile type titanium dioxide pigment were ground together in a three roll mill. The dispersion formed was treated with
37 parts of a 70% solution of an isocyanurate based on isophorone diisocyanate (Commercial product IPDI-T 1890 of the Company VEBA-Huls) in a solvent mixture of 1 part ethylglycol acetate and 2 parts xylene (content of NCO-groups 12.1–12.3%) and
4 parts of a 1% solution of a silicone oil in Shellsol A and diluted with
15 parts of xylene and
15 parts of n-butyl acetate to spraying viscosity.

(d) Application of the Varnish and Properties of the Burned on Varnish Film

The varnish obtained according to (c) was applied by spraying to double pickled deep drawable metal sheets, during 10 minutes aired dust free and baked on for 30 minutes at 150° C. The 40μ thick varnish film had the following properties:

Resistance to deep drawing according to Erichsen (DIN 53156): 7.5 mm
Striking ball penetration (ASTM D 2794-69): >100 kg.cm
Grid cut value (DIN 53151): 0
Pendulum hardness according to Konig (DIN 53157): 162 seconds
Film Resistance To:

| Deionized water (4 weeks): | no attack |
| Soda lye (5%; 4 weeks): | no attack |
| Sulfuric acid (5%; 4 weeks): | no attack |
| Super gasoline (4 weeks): | reversible softening |
| Diesel oil (3 months): | reversible softening |
| Ethanol (3 months): | reversible softening |

To examine the weather resistance, the varnish film was tested in the "Xenotest Apparatus 150" for 2000 hours with turning on and off (Cycle: 5 minutes rain, 25 minutes rain free). Thereby, there did not occur any discoloration of the varnish film.

EXAMPLE 2

(a) Production of an Adduct of 2-Hydroxyethyl Acrylate and ε-Caprolactone

The procedure was the same as in Example 1(a).

(b) Production of a (Meth) Acrylate Resin

There were present in a reaction vessel equipped with stirrer, thermometer, dropping funnel, reflux condenser, and controllable heating 66.67 parts of n-butyl acetate. While leading nitrogen therethrough the mixture was heated to 120° C., and there was dosed in within 3 hours a mixture of
30.0 parts of the adduct obtained according to (a)
42.0 parts methyl methacrylate
23.8 parts 2-ethylhexyl acrylate
4.2 parts 2-hydroxyethyl acrylate and
2.5 parts tert.butylperoxy-acetate Subsequently there were added a further 0.5 parts tert.butylperacetate and the mixture stirred for a further 2 hours at 120° C.

(c) Production of a White Pigmented Varnish 100 parts of the copolymerizate solution obtained according to (b) and 60 parts of rutile type titanium dioxide pigment were ground together in a three roll mill. The dispersion formed was treated with 25 parts of a 75% solution of a polyfunctional isocyanate based on hexamethylene diisocyanate (Commercial product Desmodur N of Bayer) in a solvent mixture of 1 part ethylglycol acetate and 1 part xylene (content of NCO-groups 16.5%) and 4 parts of a 1% solution of a silicone oil in Shellsol A and diluted with 25 parts of xylene and 25 parts of n-butyl acetate to spraying viscosity.

(d) Application of the Varnish and Properties of the Burned On Varnish Film

The varnish obtained according to (c) was applied by spraying to double pickled deep drawable metal sheets, during 10 minutes aired dust free, and baked on for 30 minutes at 110° C. or 150° C. The about 40µ thick varnish film baked on at 110° C. had a pendulum hardness, according to Konig of 156 seconds, at 150° C. it was 164 seconds. All other varnish properties were the same at both burning on temperatures.

| | |
|---|---|
| Resistance to deep drawing according to Erichsen: | 8.5 mm |
| Striking ball penetration: | 100 kg · cm |
| Grid cut value: | 0 |

The resistance of the varnish film to chemicals or solvents and to the weather correspond to the data in Example 1(a).

EXAMPLE 3

(a) Production of an Adduct of 2-Hydroxyethyl Acrylate and ε-Caprolactone

There were present in a reaction vessel equipped with stirrer, thermometer, dropping funnel, reflux condenser, and controllable heating 55.0 parts of 2-hydroxyethyl acrylate (stabilized with 700 ppm of hydroquinone monomethylether) and 0.059 parts dibutyltin oxide.

The mixture was heated to 110° C. under intensive leading through of air and there were dosed in via the dropping funnel within 1 hour 45.94 parts of ε-caprolactone.

The mixture was heated at 110° C. with stirring for a further 3 hours.

(b) Production of a (Meth) Acrylate Resin

There were present in a reaction vessel equipped with stirrer, thermometer, dropping funnel, reflux condenser, and controllable heating 33.33 parts of a solvent mixture consisting of 1 part ethyl glycol acetate and 4 parts of Shellsol A. While leading nitrogen therethrough, the mixture was heated to 145° C.; and there were dosed in within 5 hours a mixture of 40.0 parts of the adduct obtained according to (a)

30.0 parts methyl methacrylate 30.0 parts 2-ethylhexyl acrylate and 3.5 parts tert.butyl perbenzoate. Subsequently, there were added a further 0.5 parts tert.butyl perbenzoate and the mixture stirred for a further hour at 145° C. The 75% copolymerizate solution formed had a dynamic viscosity at 25° C. of 2900 mpa.s.

(c) Production of a White Pigmented Varnish 100 parts of the copolymerizate solution obtained according to (b) and 70 parts of rutile type titanium dioxide pigment were homogenized by grinding in a bead mill for 30 minutes. The dispersion formed was treated with 56 parts of the polyisocyanate solution used in Example 1(c) and 2 parts of a 1% solution of a silicone oil in Shellsol A and diluted with 30 parts of xylene and 35 parts of n-butyl acetate to spraying viscosity.

(d) Application of the Varnish and Properties of the Burned on Varnish Film

The varnish obtained according to (c) was applied by spraying to double pickled deep drawable metal sheets, during 10 minutes aired dust free, and baked on for 30 minutes at 150° C. The about 35µ thick varnish film had the following properties:

| | |
|---|---|
| Resistance to deep drawing according to Erichsen: | 8.0 mm |
| Striking ball penetration: | >100 kg · cm |
| Grid cut value: | 0 |
| Pendulum hardness according to Konig: | 160 seconds |

The resistance of the varnish film to chemicals or solvents and the weather resistance corresponded to the data in Example 1(d).

Comparison Experiment 1

For comparison, the monomers employed in preceding Example 3 were copolymerized in the weight ratios set forth there but using the procedure of Example 4 of Fisk U.S. Pat. No. 4,082,816.

There were present in a reaction vessel equipped with stirrer, thermometer, dropping funnel, reflux condenser, and controllable heating 49.0 parts of xylene and 0.01 part of tetraisopropyl titanate and the mixture heated to the boiling point under reflux. Within 4 hours there was dosed in a mixture of 10.9 parts 2-hydroxyethyl acetate 9.1 parts ε-caprolactone 15.0 parts methyl methacrylate 15.0 parts 2-ethylhexyl acrylate and 1.0 part di-tert.butyl peroxide. During the dosing and for a further 3.5 hours, the reaction mixture was heated under reflux.

The 50% copolymerizate solution formed had a dynamic viscosity at 25° C. of 128 mpa.s.

100 parts of this copolymerizate solution and 50 parts of rutile type titanium dioxide pigment were homogenized in a bead mill by grinding for 30 minutes. The dispersion obtained was treated with 2 parts of a 1% solution of a silicone oil in xylene and alternatively with (a) 32.5 parts of the polyisocyanate solution used in Example 3(c).

(b) 30.0 parts of a butylated melamineformaldehyde resin (Maprenal 80/15) and (c) 25.0 parts hexamethylol melamine (Cymel 301).

The thus obtained varnishes were applied by spraying to double pickled deep drawable metal sheets, during 10 minutes aired dust free, and baked for 30 minutes at 150° C. The varnish films had the following properties

|  | (a) | (b) | (c) |
|---|---|---|---|
| Coating thickness | 26μ | 34μ | 32μ |
| Resistance to deep drawing according to Erichsen | 6.0mm | 4.5mm | 1.5mm |
| Striking ball penetration | 80 kg · cm | 60 kg · cm | 5 kg · cm |
| Grid cut value | 1-2 | 2-3 | 4 |
| Pendulum hardness according to Konig | 141 sec. | 120 sec. | 131 sec. |

COMPARISON EXPERIMENT 2

Comparison Experiment 1 was repeated with the difference that there was used in place of xylene the solvent mixture of Example 3, in place of tetraisopropyl titanate dibutyltin oxide and in place of di-tert.butyl peroxide tert.butyl perbenzoate:

There were present in a reaction vessel equipped with stirrer, thermometer, dropping funnel, reflux condenser, and controllable heating 39.2 parts Shellsol A 9.8 parts ethyl glycol acetate and 0.0117 part dibutyltin oxide and the mixture heated under reflux to boiling. Within 4 hours, there was dosed in a mixture of 10.9 parts 2-hydroxyethyl acrylate 9.1 parts ε-caprolactone 15.0 parts methyl methacrylate 15.0 parts 2-ethylhexyl acrylate and 1.0 part tert.butyl perbenzoate. During the dosing and for a further 3.5 hours, the reaction mixture was heated under reflux.

100 parts of the thus obtained 50% copolymerizate solution and 50 parts of rutile type titanium dioxide pigment were homogenized by grinding for 30 minutes on a bead mill. The dispersion obtained was treated with 2 parts of a 1% solution of a silicone oil in a Shellsol A and alternatively with (a) 32.5 parts of the polyisocyanate solution used in Example 3(c), (b) 30.0 parts of a butylated melamineformaldehyde resin (Maprenal 80/15) and (c) 25.0 parts hexamethylol melamine (Cymel 301).

The thus obtained varnishes were applied by spraying to double pickled deep drawable metal sheets, aired dust free during 10 minutes, and baked on for 30 minutes at 150° C. The varnish films had the following properties:

|  | (a) | (b) | (c) |
|---|---|---|---|
| Coating thickness | 35μ | 22μ | 35μ |
| Resistance to deep drawing according to Erichsen | 5mm | 5mm | 1mm |
| Striking ball penetration | 30 kg · cm | 40 kg · cm | 5kg · cm |
| Grid cut value | 1-2 | 2-3 | 4 |
| Pendulum hardness according to Konig | 154 sec. | 110 sec. | 126 sec. |

EXAMPLE 4

(a) Production of an Adduct of 2-Hydroxyethyl Methacrylate and ε-Caprolactone There were present in a reaction vessel equipped with stirrer, thermometer, dropping funnel, reflux condenser, and controllable heating 59.7 parts of 2-hydroxyethyl methacrylate (stabilized with 395 ppm of hydroquinone monomethyl ether) and 0.028 parts dioctyltin oxide. The mixture was heated to 125° C. under intensive leading through of air and there were dosed in via the dropping funnel within 3 hours 40.27 parts of ε-caprolactone.

The mixture was heated at 125° C. with stirring for a further 2 hours.

(b) Production of a (Meth) Acrylate Resin

There were present in a reaction vessel equipped with stirrer, thermometer, dropping funnel, reflux condenser, and controllable heating 26.0 parts of a solvent mixture consisting of 1 part ethyl glycol acetate and 4 parts Shellsol A. While leading nitrogen therethrough, the mixture was heated to 150° C.; and there were dosed in within 5 hours a mixture of 45.0 parts of the adduct obtained according to (a)

33.0 parts methyl methacrylate 12.0 parts 2-ethylhexyl acrylate 15.0 parts n-butyl acrylate 2.6 parts tert.butyl perbenzoate and 2.1 parts di-tert. butyl peroxide. The mixture was stirred for a further hour at 150° C. The 80% copolymerizate solution formed had a dynamic viscosity at 25° C. of 3500 mpa.s.

(c) Production of a White Pigmented Varnish 100 parts of the copolymerizate solution obtained according to (b) and 80 parts of rutile type titanium dioxide pigment were homogenized by grinding for 30 minutes on a bead mill. The dispersion formed was treated with 42 parts of the polyisocyanate solution used in Example 2(c) and 2 parts of a 1% solution of a silicone oil in Shellsol A and diluted with xylene and n-butyl acetate in the ratio 3:4 to spraying viscosity.

(d) Application of the Varnish And Properties of the Burned On Varnish Film

The varnish obtained according to (c) was applied by spraying to double pickled deep drawable metal sheets, during 10 minutes aired dust free, and baked on for 30 minutes at 150° C. The 30μ thick varnish film had the following properties:

| Resistance to deep drawing according to Erichsen: | 8.0 mm |
|---|---|
| Striking ball penetration: | 100 kg · cm |
| Grid cut value: | 0 |

| | |
|---|---|
| Pendulum hardness according to Konig: | 157 seconds |

The resistance of the varnish film to chemicals or solvents and the weather resistance corresponded to the data in Example 1(d).

EXAMPLE 5

(a) Production of An Adduct of 2-Hydroxypropyl Methacrylate and ε-Caprolactone

There were present in a reaction vessel equipped with stirrer, thermometer, dropping funnel, reflux condenser, and controllable heating 45.7 parts of 2-hydroxypropyl methacrylate (stabilized with 350 ppm of hydroquinone monomethyl ether) and 0.012 parts dibutyltin oxide. The mixture was heated to 105° C. under intensive leading through of air and there were dosed in via the dropping funnel within 1 hour 54.29 parts of ε-caprolactone.

The mixture was heated at 115° C. with stirring for a further 3 hours.

(b) Production of a (Meth) Acrylate Resin

There were present in a reaction vessel equipped with stirrer, thermometer, dropping funnel, condenser, and controllable heating 25.0 parts of a solvent mixture consisting of 2 parts ethyl glycol acetate and 5 parts xylene. While leading nitrogen therethrough, the mixture was heated to 150° C.; and there was dosed in within 4 hours a mixture of 55.0 parts of the adduct obtained according to (a)
18.0 parts methyl methacrylate
27.0 parts n-butyl acrylate and
4.0 parts tert.butyl perbenzoate. Subsequently, there were added a further 0.5 parts tert.butylperbenzoate, and the mixture stirred for a further hour at 150° C. The 80% copolymerizate solution formed had a dynamic viscosity at 25° C. of 8500 mpa.s.

(c) Production of a White Pigmented Varnish 100 parts of the copolymerizate solution obtained according to (b) and 70 parts of rutile type titanium dioxide pigment were homogenized by grinding in a bead mill. The dispersion formed was treated with 41 parts of the polyisocyanate solution used in Example 1(c) and 2 parts of a 1% solution of a silicone oil in xylene and diluted with xylene and n-butyl acetate in the ratio of 3:4 to spraying viscosity.

(d) Application of the Varnish And Properties of the Burned On Varnish Film

The varnish obtained according to (c) was applied by spraying to double pickled deep drawable metal sheets, during 10 minutes aired dust free, and baked on for 30 minutes at 150° C. The about 35μ thick varnish film had the following properties:

| | |
|---|---|
| Resistance to deep drawing according to Erichsen: | 7.5 mm |
| Striking ball penetration: | 100 kg · cm |
| Grid cut value: | 0-1 |
| Pendulum hardness according to Konig: | 150 seconds |

The resistance of the varnish film to chemicals or solvents and the weather resistance corresponded to the data in Example 1(d).

EXAMPLE 6

(a) Production of an Adduct of 2-Hydroxypropyl Acrylate and ε-Caprolactone

There were present in a reaction vessel equipped with stirrer, thermometer, dropping funnel, reflux condenser, and controllable heating 53.2 parts of 2-hydroxypropyl acrylate (stabilized with 625 ppm of hydroquinone monomethyl ether) and 0.041 parts dibutyltin glycolate. The mixture was heated to 95° C. under intensive leading through of air and there were dosed in via the dropping funnel within 3 hours.

46.76 parts of ε-caprolactone.

The mixture was heated at 115° C. with stirring for a further 3 hours.

(b) Production of a (Meth) Acrylate Resin

There were present in a reaction vessel equipped with stirrer, thermometer, dropping funnel, reflux condenser, and controllable heating 25.0 parts of a solvent mixture consisting of 3 parts ethyl glycol acetate and 2 parts Shellsol A. While leading nitrogen therethrough, the mixture was heated to 150° C.; and there was dosed in within 6 hours a mixture of 46.0 parts of the adduct obtained according to (a)
16.0 parts methyl methacrylate
20.0 parts 2-ethylhexyl acrylate
15.3 parts styrene
2.7 parts 2-hydroxyethyl acrylate and
3.5 parts tert.butyl perbenzoate. Subsequently, there were added a further 0.6 parts tert.butylperbenzoate and the mixture stirred for a further hour at 150°C. The 80% copolymerizate solution formed had a dynamic viscosity at 25° C. of 3200 mpa.s.

(c) Production of a White Pigmented Varnish 100 parts of the copolymerizate solution obtained according to (b) and 70 parts of rutile type titanium dioxide pigment were homogenized by grinding in a bead mill. The dispersion formed was treated with 38 parts of the polyisocyanate solution used in Example 1(c).

2 parts of a 1% solution of a silicone oil in Shellsol A and diluted with xylene and n-butyl acetate in the ratio 5:6 to spraying viscosity.

(d) Application of the Varnish And Properties of the Burned On Varnish Film

The varnish obtained according to (c) was applied by spraying to double pickled deep drawable metal sheets, during 10 minutes aired dust free and baked on for 30 minutes at 150° C. The about 38μ thick varnish film had the following properties:

| | |
|---|---|
| Resistance to deep drawing according to Erichsen: | 7.5 mm |
| Striking ball penetration: | 100 kg · cm |
| Grid cut value: | 0–1 |
| Pendulum hardness according to Konig: | 165 seconds |

The resistance of the varnish film to chemicals or solvents and the weather resistance corresponds to the data in Example 1(d).

EXAMPLE 7

(a) Production of an Adduct of 4-Hydroxybutyl Acrylate and ε-Caprolactone

There were present in a reaction vessel equipped with stirrer, thermometer, dropping funnel, reflux condenser, and controllable heating
45.27 parts of 4-hydroxybutyl acrylate (stabilized with 500 ppm of hydroquinone monomethyl ether) and 0.023 parts dibutyltin oxide.
The mixture was heated to 120° C. under intensive leading through of air, and there were dosed in via the dropping funnel within 2 hours
54.7 parts of ε-caprolactone.
The mixture was heated at 120° C. with stirring for a further 3 hours.

(b) Production of a (Meth) Acrylate Resin

There were present in a reaction vessel equipped with stirrer, thermometer, dropping funnel, reflux condenser, and controllable heating
33.33 parts of a solvent mixture consisting of 1 part ethyl glycol acetate and 5 parts xylene. While leading nitrogen therethrough, the mixture was heated to 140° C.; and there was dosed in within 4.5 hours a mixture of
  40.0 parts of the adduct obtained according to (a)
  21.0 parts methyl methacrylate
  21.0 parts 2-ethylhexyl acrylate
  12.0 parts styrene
  6.0 parts 2-hydroxyethyl acrylate and
  4.0 parts tert. butyl peracetate.
Subsequently, there were added a further
  0.4 parts tert. butylperacetate and the mixture stirred for a further 45 minutes at 140° C. The 75% copolymerizate solution formed had a dynamic viscosity at 25° C. of 6700 mpa.s.

(c) Production of a White Pigmented Varnish 100 parts of the copolymerizable solution obtained according to (b) and
70 parts of rutile type titanium dioxide pigment were homogenized by grinding in a bead mill. The dispersion formed was treated with
48 parts of the polyisocyanate solution used in Example 1(c) and
3 parts of a 1% solution of a silicone oil in xylene and diluted with
  xylene and
  n-butyl acetate in the ratio 8:7 to spraying viscosity.

(d) Application of the Varnish And Properties of the Burned On Varnish Film

The varnish obtained according to (c) was applied by spraying to double pickled deep drawable metal sheets, during 10 minutes aired dust free, and baked on for 30 minutes at 150° C. The about 35μ thick varnish film had the following properties:

| | |
|---|---|
| Resistance to deep drawing according to Erichsen: | 8.0 mm |
| Striking ball penetration: | 100 kg · cm |
| Grid cut value (DIN 53151): | 0–1 |
| Pendulum hardness according to Konig (DIN 43157): | 158 seconds |

The resistance of the varnish film to chemicals or solvents and the weather resistance corresponded to the data in Example 1(d).

EXAMPLE 8

(a) Production of an Adduct of 2-Hydroxyethyl Acrylate and ε-Caprolactone

There was employed the same procedure as in Example 1(a).

(b) Production of a (Meth) Acrylate Resin

There were present in a reaction vessel equipped with stirrer, thermometer, dropping funnel, reflux condenser, and controllable heating
  20 parts xylene
  10 parts n-butyl acetate and
  10 parts Shellsol A.
While leading nitrogen therethrough, the mixture was heated to 100° C.; and there was dosed in within 3 hours a mixture of
  15.0 parts of the adduct obtained according to (a)
  75.0 parts methyl methacrylate
  10.0 parts n-butyl acrylate
  3.0 parts n-dodecyl mercaptan
  1.0 part isopropyl percarbonate
  1.5 parts t-butyl perpivalate and
  1.5 parts tert. butyl peroctoate.
Subsequently, there were added a further
  0.5 parts t-butyl peroctoate and the mixture stirred for a further 2 hours at 105° C.

(c) Production of a White Pigmented Varnish 100 parts of the 60% copolymerizate solution obtained according to (b) and
30 parts of rutile type titanium dioxide pigment were ground together in a three roll mill. The dispersion formed was treated with
11 parts of a 75% solution of a polyfunctional aliphatic isocyanate based on hexamethylene diisocyanate (Commercial product Desmodur N of Bayer) in a solvent mixture of 1 part ethylglycol acetate and 1 part xylene (content of NCO-groups 16.5%) and
4 parts of a 1% solution of a silicone oil in Shellsol A and diluted with
  60 parts of a solvent mixture of xylene,
  n-butyl acetate and
Shellsol A in the ratio 2:1:1 to spraying viscosity.

(d) Application of the Varnish And Properties of the Burned On Varnish Film

The varnish obtained according to (c) was applied by spraying to double pickled deep drawable metal sheets, during 10 minutes aired dust free, and baked on for 30 minutes at 80° C. The about 25μ thick varnish film had the following properties:

| | |
|---|---|
| Resistance to deep drawing according to Erichsen: | 8 mm |
| Striking ball penetration: | 50 kg · cm |

| | |
|---|---|
| Grid cut value: | 0–1 |
| Pendulum hardness according to Konig: | 155 seconds |

EXAMPLE 9

(a) Production of an Adduct of 2-Hydroxyethyl Acrylate and ε-Caprolactone

There was employed the same procedure as in Example 1(a).

(b) Production of a (Meth) Acrylate Resin

There were present in a reaction vessel equipped with stirrer, thermometer, dropping funnel, reflux condenser, and controllable heating
20 parts of xylene
10 parts n-butyl acetate and
10 parts Shellsol A.
While leading nitrogen therethrough, the mixture was heated to 110° C.; and there was dosed in within 3 hours a mixture of
28 parts of the adduct obtained according to (a)
72 parts methyl methacrylate
3.5 parts dodecyl mercaptan
0.5 parts isopropyl percarbonate
2.0 parts t-butyl perpivalate
1.5 parts t-butyl peroctoate.
Subsequently, there were added a further
0.5 parts t-butyl peroctoate and the mixture stirred for a further 2.5 hours at 105° C.

(c) Production of a White Pigmented Varnish 100 parts of the 60% copolymerizate solution obtained according to (b) and
32 parts of rutile type titanium dioxide pigment were ground together in a three roll mill. The dispersion formed was treated with
20 parts of a 75% solution of a polyfunctional aliphatic isocyanate based on hexamethylene diisocyanate (Commercial product Desmodur N of Bayer) in a solvent mixture of 1 part ethylglycol acetate and 1 part xylene (content of NCO-groups 16.5%) and
1 part of a 1% solution of a silicone oil in Shellsol A and diluted with 70 parts of a solvent mixture of xylene, n-butyl acetate and Shellsol A in the ratio 2:1:1 to spraying viscosity.

(d) Application of the Varnish And Properties of the Burned On Varnish Film

The varnish obtained according to (c) was applied by spraying to double pickled deep drawable metal sheets, during 15 minutes aired dust free, and baked on for 30 minutes at 130° C. The about 35μ thick varnish film had the following properties:

| | |
|---|---|
| Resistance to deep drawing according to Erichsen: | 9 mm |
| Striking ball penetration: | 100 kg · cm |
| Grid cut value (DIN 53151): | 0–1 |
| Pendulum hardness according to Konig: | 175 seconds |

The entire disclosure of German priority application P 30 27776.0-44 is hereby incorporated by reference.
What is claimed is:

1. A process for the production of a hydroxyl group containing, ε-caprolactone modified, isocyanate cross-linkable acrylate, or methacrylate resin comprising
   (1) reacting at least one monoester of acrylic acid or methacrylic acid with an alkanediol having 2 to 4 carbon atoms in the molar ratio of 1.5:1 to 1:3 with ε-caprolactone at a temperature between 60° and 130° C. in the presence of 0.005 to 0.15 weight percent based on the weight of the ε-caprolactone employed of an organotin compound catalyst for the reaction of a hydroxyl group containing compound with ε-caprolactone and
   (2) copolymerizing
      (a) 15 to 55 weight percent of the adduct obtained according to (1) with
      (b) 45 to 85 weight percent of a mixture of monomers which is composed of, in each case based on the weight of component (b),
         ($b_1$) 10 to 90 weight percent of at least one ester of methacrylic acid whose homopolymerizate has a glass transition temperature of above 60° C.,
         ($b_2$) 10 to 90 weight percent of at least one ester of acrylic or methacrylic acid whose homopolymerizate has a glass transition temperature of below 60° C.,
         ($b_3$) 0 to 35 weight percent of at least one vinyl aromatic compound and
         ($b_4$) 0 to 10 weight percent of at least one monoester of acrylic or methacrylic acid with an alkanediol having 2 to 4 carbon atoms as a solution in
      (c) 15 to 45 weight percent based on the total weight of components (a), (b), and (c) of at least one solvent for the acrylate or methacrylate resin which solvent is inert to isocyanates, in the presence of at least one catalyst which decomposes thermally into radicals.

2. A process according to claim 1 wherein neither component ($b_3$) nor component ($b_4$) is present.

3. A process according to claim 1 wherein component ($b_3$) is present.

4. A process according to claim 1 wherein component ($b_4$) is present.

5. A process according to claim 1 wherein both components ($b_3$) and ($b_4$) are present.

6. A process according to claim 1 wherein component (c) is employed in an amount of 15 to 30 weight percent based on the total weight of components (a), (b), and (c) and there is used a catalyst having a half life between 0.3 and 0.7 hours at 130° C.

7. A process according to claim 1 wherein component (c) is employed in an amount of 15 to 30 weight percent based on the total weight of components (a), (b), and (c) and there is used a catalyst having a half life between 0.02 and 0.7 hours and a catalyst having a half life between 1 and 6 hours, in each case at 130° C.

8. A process according to claim 1 wherein component (c) is employed in an amount of 30 to 45 weight percent based on the total weight of components (a), (b), and (c) and there is used a catalyst having a half life between 0.005 and 0.7 hours at 100° C.

9. A process according to claim 1 wherein there is employed 30 to 55 weight percent of component (a) and 45 to 70 weight percent of (b).

10. A process according to claim 9 wherein component ($b_2$) forms a homopolymerizate with a glass transition temperature of below 0° C.

11. A process according to claim 1 wherein component ($b_2$) forms a homopolymerizate with a glass transition temperature of below 0° C.

12. The composition produced by the process of claim 1.

13. The composition produced by the process of claim 2.

14. The composition produced by the process of claim 3.

15. The composition produced by the process of claim 4.

16. The composition produced by the process of claim 5.

17. The composition produced by the process of claim 6.

18. The composition produced by the process of claim 7.

19. The composition produced by the process of claim 8.

20. The composition produced by the process of claim 9.

21. The composition produced by the process of claim 10.

22. The composition produced by the process of claim 11.

* * * * *